(12) United States Patent
Thomas et al.

(10) Patent No.: US 11,900,922 B2
(45) Date of Patent: Feb. 13, 2024

(54) MULTILINGUAL INTENT RECOGNITION

(71) Applicant: International Business Machines Corporation, Armonk, NY (US)

(72) Inventors: Samuel Thomas, White Plains, NY (US); Hong-Kwang Kuo, Pleasantville, NY (US); Kartik Audhkhasi, White Plains, NY (US); Michael Alan Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 17/093,673

(22) Filed: Nov. 10, 2020

(65) Prior Publication Data
US 2022/0148581 A1 May 12, 2022

(51) Int. Cl.
| | |
|---|---|
| *G10L 15/16* | (2006.01) |
| *G10L 15/08* | (2006.01) |
| *G06F 40/295* | (2020.01) |
| *G06N 3/04* | (2023.01) |
| *G06F 18/214* | (2023.01) |

(52) U.S. Cl.
CPC .......... *G10L 15/16* (2013.01); *G06F 18/2148* (2023.01); *G06N 3/04* (2013.01); *G06F 40/295* (2020.01); *G10L 2015/088* (2013.01)

(58) Field of Classification Search
CPC .. G10L 15/16; G10L 2015/088; G06F 40/295
See application file for complete search history.

(56) References Cited

U.S. PATENT DOCUMENTS

| | | | |
|---|---|---|---|
| 7,716,050 B2 | 5/2010 | Gillick | |
| 9,460,711 B1 | 10/2016 | Vanhoucke | |
| 9,520,127 B2 | 12/2016 | Li | |
| 9,842,585 B2 * | 12/2017 | Huang | ................... G06N 3/045 |

(Continued)

FOREIGN PATENT DOCUMENTS

CN 114548200 A 5/2022

OTHER PUBLICATIONS

Liu, Zihan, et al. "Attention-informed mixed-language training for zero-shot cross-lingual task-oriented dialogue systems." Proceedings of the AAAI Conference on Artificial Intelligence. vol. 34. No. 05. 2020 (Year: 2020).*

(Continued)

*Primary Examiner* — Bhavesh M Mehta
*Assistant Examiner* — Nandini Subramani
(74) *Attorney, Agent, or Firm* — Brian M. Restauro (57) ABSTRACT

Embodiments of the present invention provide computer implemented methods, computer program products and computer systems. For example, embodiments of the present invention can access one or more intents and associated entities from limited amount of speech to text training data in a single language. Embodiments of the present invention can locate speech to text training data in one or more other languages using the accessed one or more intents and associated entities to locate speech to text training data in the one or more other languages different than the single language. Embodiments of the present invention can then train a neural network based on the limited amount of speech to text training data in the single language and the located speech to text training data in the one or more other languages.

18 Claims, 7 Drawing Sheets

(56) References Cited

U.S. PATENT DOCUMENTS

| | | | |
|---|---|---|---|
| 10,008,209 | B1 | 6/2018 | Qian |
| 10,229,674 | B2* | 3/2019 | Menezes ............... G10L 15/187 |
| 10,629,193 | B2 | 4/2020 | Ye |
| 10,832,003 | B2* | 11/2020 | Costello ................. G06N 3/044 |
| 11,308,938 | B2* | 4/2022 | Wieman .............. G10L 15/1822 |
| 11,354,504 | B2* | 6/2022 | Motahari Nezhad ........................ G06F 40/284 |
| 2017/0287474 | A1* | 10/2017 | Maergner ............. G10L 15/063 |
| 2019/0189111 | A1* | 6/2019 | Watanabe ............... G10L 15/16 |
| 2019/0361977 | A1* | 11/2019 | Crudele ................ G06F 40/284 |

OTHER PUBLICATIONS

Huang et al., "Cross-Language Knowledge Transfer Using Multilingual Deep Neural Network With Shared Hidden Layers", 2013 IEEE International Conference on Acoustics, Speech and Signal Processing, 5 pages.

Tong et al., "An Investigation of Deep Neural Networks for Multilingual Speech Recognition Training and Adaptation", Proc. of Interspeech. 2017, 5 pages.

\* cited by examiner

MULTILINGUAL INTENT RECOGNITION

BACKGROUND

The present invention relates in general to intent recognition and in particular to multilingual training for speech to intent recognition.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

In machine learning, a hyperparameter is a configuration that is external to the model and whose value cannot be estimated from data. Hyperparameters are used in processes to help estimate model parameters. Hyperparameter are set before the learning (e.g., training) process begins by contrast, the values of other parameters are derived via training. Different model training algorithms require different hyperparameters, some simple algorithms, such as least squares regression, require none. Given a set of hyperparameters, a training algorithm learns the parameter values from the data for instance, least absolute shrinkage and selection operator (LASSO) is an algorithm that adds a regularization hyperparameter to least squares regression, required to be set before estimating the parameters through the training algorithm. Similar machine learning models can require different hyperparameters (e.g., different constraints, weights, or learning rates) to generalize different data patterns.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised). Deep learning models include Artificial Neural Networks (ANNs) inspired by information processing and distributed communication nodes in biological systems. ANNs have various differences from biological brains.

Neural networks (NNs) are computing systems inspired by biological neural networks. NNs are not simply algorithms, but rather a framework for many different machine learning algorithms to work together and process complex data inputs. Such systems "learn" to perform tasks by considering examples, generally without being programmed with any task-specific rules. For example, in image recognition, NNs learn to identify images that contain cats by analyzing example images that are correctly labeled as "cat" or "not cat" and using the results to identify cats in other images. NNs accomplish this without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of multilayer perceptrons (e.g., fully connected networks), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme. CNNs use relatively little pre-processing compared to other image classification algorithms, allowing the network to learn the filters that in traditional algorithms were hand-engineered.

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. For an LSTM, the learning rate followed by the network size are the most crucial hyperparameters.

SUMMARY

According to an aspect of the present invention, there is provided a computer-implemented method. The method comprises accessing one or more intents and associated entities from limited amount of speech to text training data in a single language; locating speech to text training data in one or more other languages using the accessed one or more intents and associated entities to locate speech to text training data in the one or more other languages different than the single language; and training a neural network based on the limited amount of speech to text training data in the single language and the located speech to text training data in the one or more other languages.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that traditional spoken language understanding system have typically been constructed in 2 parts: an automatic speech recognition (ASR) system that decodes speech to text, followed by a natural language understanding module for intent recognition, entity extraction etc. With current neural network-based architectures it is now possible to train single end-to-end systems that can extract intent and entity information directly from the speech signal without having to produce the intermediate textual representation of the input. Embodiments of the present invention recognize deficiencies of current neural network-based architectures, that is, the amount of task specific training data (e.g., speech data with intent labels) to train these systems is often limited.

In these settings, embodiments of the present invention recognize that traditional systems have an advantage. Since traditional systems are trained in parts, it is possible to achieve good performances by training each component separately. The automatic speech recognition component can be trained on large amounts of transcribed data collected independently without any intent labels. The subsequent intent classifier can then be trained on relatively fewer amounts of data. It is also often the case since the data for training the intent classifier is purely text based, the data sparsity issue with speech data labeled with intent is often mitigated.

Embodiments of the present invention recognize the difficulty in training end-to-end speech-to-intent systems caused by requirements to use significantly larger amounts of speech data. Embodiments of the present invention recognize that the amount of speech training data is often limited. This problem is magnified in instances where the automatic speech recognition considers a subtask, as speech data needs to be transcribed as well.

Embodiments of the present invention provides solutions to limited training data. In other words, embodiments of the present invention provide solutions to mitigate the data training issue via multilingual training. For example, embodiments of the present invention can, in multilingual training, pool data from various languages to train a neural network model. This trained neural network model includes a set of shared layers that are common to the pool of languages. Embodiments of the present invention can then use language specific targets. As discussed in greater detail later in this specification, parameters of the network model can be better trained by pooling data from multiple languages.

Figure 1:
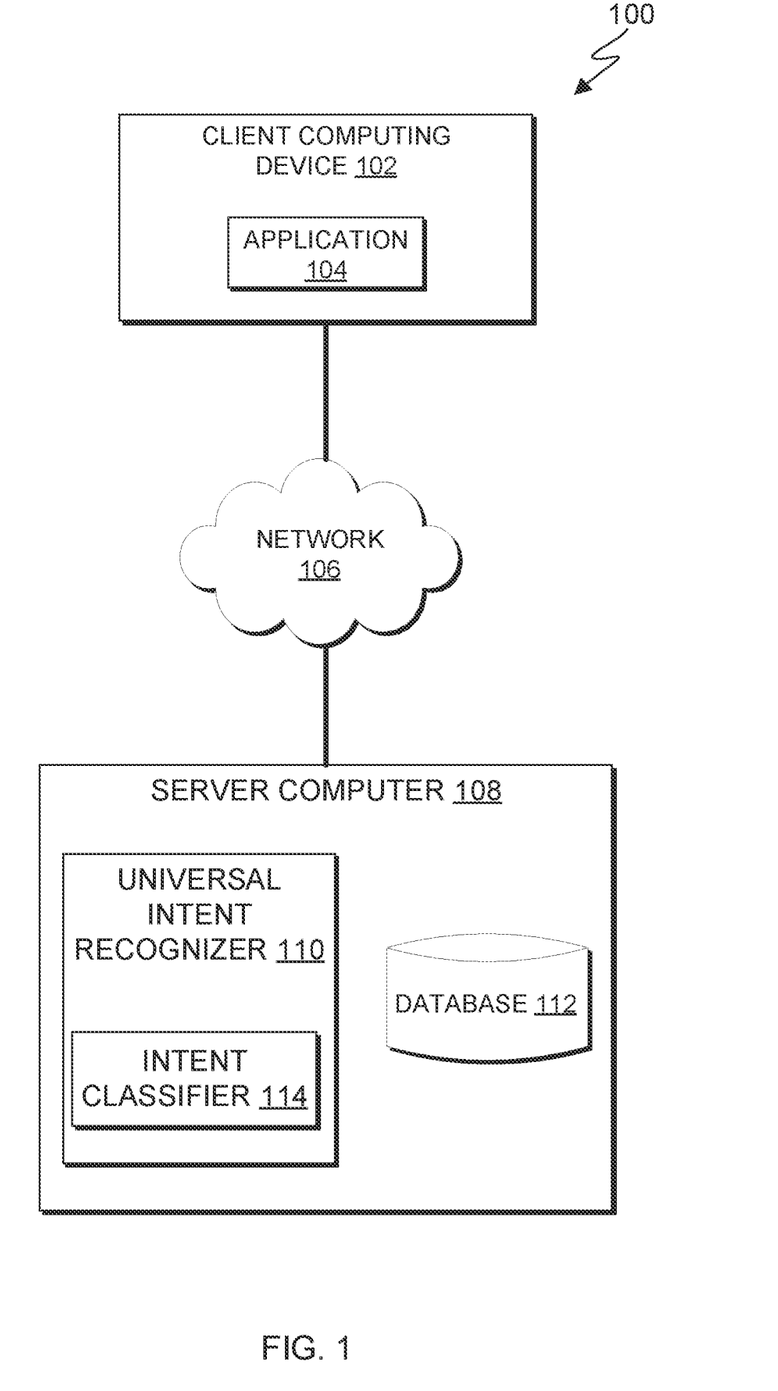
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 7.

In this embodiment, client computing device 102 is a user device associated with a user and includes application 104. Application 104 communicates with server computer 108 to access universal intent recognizer 110 (e.g., using TCP/IP) to access content, user information, and database information. Application 104 can further communicate with universal intent recognizer 110 to transmit instructions to train a multilingual neural network intent classifier as discussed in greater detail with regard to FIGS. 2-6.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts universal intent recognizer 110 and database 112. In this embodiment, universal intent recognizer 110 resides on server computer 108. In other embodiments, universal intent recognizer 110 can have an instance of the program (not shown) stored locally on client computer device 102. In other embodiments, universal intent recognizer 110 can be a standalone program or system that trains a multilingual neural network intent classifier. In yet other embodiments, universal intent recognizer 110 can be stored on any number or computing devices.

Universal intent recognizer 110 trains a multilingual neural network intent classifier, that is, universal intent recognizer 110 can identify intent from either speech or text regardless of language associated with received content (e.g., speech or text). In this embodiment, universal intent recognizer 110 includes intent classifier 114. Intent classifier 114 classifies intent from received content.

Intent, as used herein, refers to a state of mind or purpose. For example, an intent can be a purpose, will, or determination behind an action, thought, or utterance. As a specific example, in this sentence: "I want to book a flight from New York to Boston", the intent is "book flight". New York and Boston are values corresponding to entities "departure city" and "arrival city". The collection of entities and values in a sentence can also be considered part of the sentence's intent. There are a host of other such attributes that can be classified or referred to as "intents", for example, part-of-speech-tags, dialog state tags etc.

In this embodiment, content refers to received media. For example, media can include one or more audio files containing speech. Media can also include received text or text files. In some embodiments, media can further include video files containing audio (e.g., speech).

Figure 2:
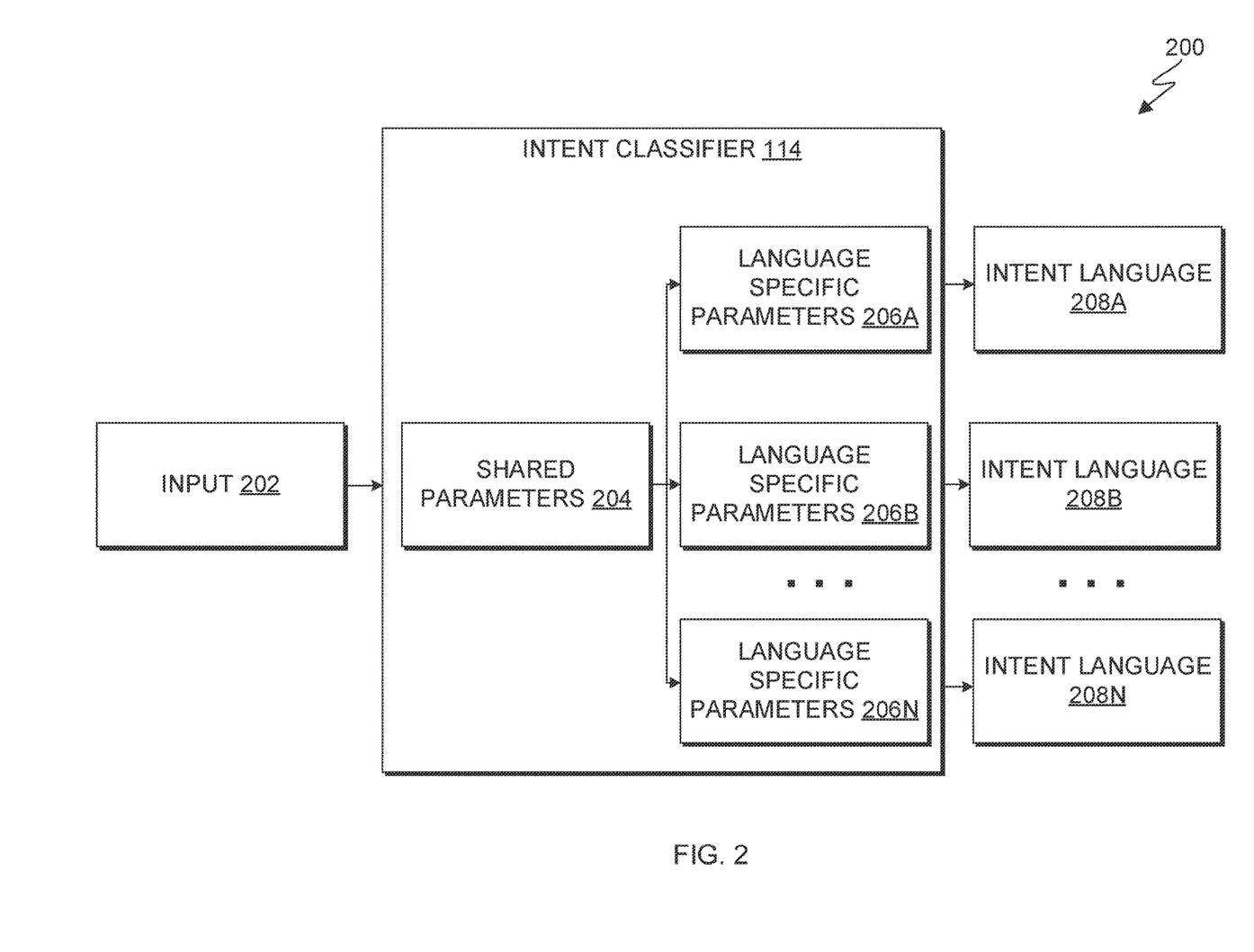
FIG. 2 depicts an example block diagram for training an end to end intent classifier, in accordance with an embodiment of the present invention.

In this embodiment, universal intent recognizer 110 pre-trains a neural network using multilingual speech (e.g., known training data) as received input and pooling together shared parameters trained on all languages as described in greater detail with respect to FIG. 2.

In this embodiment, the term "shared parameters" is used to represent a set of common layers of the neural network that are trained using multilingual data. A layer of a neural network comprises of a set of nodes. Each layer is connected to other layers via connections that have weights on them. Nodes are associated with different kinds of non-linearities, a bias term, gates controlling information flow etc. There are several variants of nodes and network connections depending on the kind of the network that can be used. LSTMs, CNNs, RNNs, DNNs are examples of neural networks. For examples, shared parameters 204 (discussed and described in FIG. 2) is a representation of such a set of common network layers that form part of a multilingual intent classifier.

In this embodiment, the term "language specific parameters" is used to represent a set of layers of the neural network that are trained using data specific to a language. A layer of a neural network comprises of a set of nodes. Each layer is connected to other layers via connections that have weights on them. Nodes are associated with different kinds of non-linearities, a bias term, gates controlling information flow etc. There are several variants of nodes and network connections depending on the kind of the network that can be used. LSTMs, CNNs, RNNs, DNNs are examples of neural networks. Language specific parameters 206A-N (shown in described in FIG. 2) are representations of language specific network layers that form part of the multilingual intent classifier. While processing multilingual data from N languages, component 204 (also referred to as shared parameters 204) is trained on all of the data. Components 206A-N (also referred to as language specific parameters 206A-N), on the other hand are trained on data specific to each language. Each component 206A-N is connected to the single shared component 204. Every language also has a language specific intent prediction layer represented by 208A-N (also referred to as intent language 208A-N).

In this embodiment, intent classifier 114 can then parse the received content into separate, language specific parameters. Consider a reservation system that processes flight reservations in Spanish and English. A corpus consisting of Spanish and English speech utterances is used to train this system. The multilingual speech corpus is annotated with various intents like "book flight", "cancel flight", "check flight status", "modify travel reservation". Each of the utterances is also annotated with entities. At test time, when an utterance in English is passed through this network, the recognized intent and entities will be available at the English-specific output of the network. For Spanish utterances, outputs will be available at the Spanish-specific output layer. Such a network is pre-trained with a network architecture illustrated in FIG. 2. The network has layers that are trained on both Spanish and English data. Multilingual speech representations from these shared network layers are then passed into language specific layers to produce the desired intent outputs.

With the Spanish training data, the training signal passes through the shared layers, through the Spanish specific layers and is validated at the Spanish specific output. With the English data, the training signal similarly passes through the shared layers before it is processed by English specific layers and outputs are collected at the English specific output layer.

In a different embodiment, the multilingual data that is available might not have intent labels but just transcripts. In this case, a multilingual network can still be pretrained. Similar to pre-training described above, using the available multilingual data, shared layers and language specific layers can be trained on the multilingual data.

In another embodiment, the data available can still be in a single language but corresponding to different domains, for example banking, airlines, hospitality etc. In such a setting, data from the various domains are pooled together. Similar to the multilingual case the shared layers are trained on all the available data. The language specific layers will however now correspond to domain specific layers: there will be a set of layers that correspond to the bank domain, a different set of layers that corresponds to the airline domain and so forth. These domain specific layers will in turn all be connected to a set of shared layers.

In another embodiment, the data available can still be in a single language but drawn from different datasets, for example, a dataset collected to model dialog states, a dataset of voice commands etc. In this setting, the data from the various datasets will again be pooled together. Similar to the multilingual case the shared layers are trained on all the available data. The language specific layers will however now correspond to dataset specific layers: there will be a set of layers that correspond to the dialog state dataset, a different set of layers that corresponds to the voice commands and so forth. These domain specific layers will in turn all be connected to a set of shared layers.

In another embodiment, this model can also handle scenarios with language switching. A data can have for example sentences where a person is speaking in English, switches to Spanish and then back to English etc. (also called code switching). The data in this case is from the same domain but different languages are pooled so that the system can take advantage of commonalities in intents and entities. Once trained in such a setting, in this embodiment the system will be able to process speech with code switching when terms in two languages are used within the same utterance. This could also help in call center analytics where client data in different languages need to be analyzed together. For example, what is the frequency of people booking flights to Houston this month compared with last month, regardless of which language was spoken.

Intent classifier 114 can then discern a respective intent from each of the discerned or otherwise identified languages. Once a multilingual/multi-domain/multi-corpus network has been pretrained as described above, it can be refined for a final intent classification task at hand. Consider the multilingual flight reservation network described above. The network has been trained on both English and Spanish data with generic flight reservation data and labels. This network can now be adapted for a particular airline and their specific data. Depending on the nature of the data, either the entire pre-trained network or parts of the network can be used.

Case 1: The novel data that has been received is in English and has been label with the generic labels that were used to train the data. The novel data contains acoustic characteristics because of the nature of data collection in a different demographic. The shared pre-trained network layers along with the English specific layers are used to initialize a new network. This new network is then trained with the novel data.

Case 2: The novel data has been received in English but has been labeled with a new intent label set. In this case, the novel network that is trained on the received data is initialized with the shared multilingual layers and the English specific layers but a new intent output layer is used to cover for the new intent label set. Once initialized, the network is then fully trained.

Case 3: The novel data has been received in German and is also labeled with a new intent label set. In this setting, the novel network is initialized with just the shared multilingual parameters. Similar such use cases can be envisioned in the multi-domain/multi-corpus case.

Intent classifier 114 can then receive unknown media, that is, unidentified speech in real time. Intent classifier 114 can then access shared parameters trained on all languages, identify a respective language and associated language specific parameters that matched the unknown media, and identify intent associated with the unknown media. As described in greater detail with respect to FIG. 3.

In other embodiments, universal intent recognizer 110 can be modified to predict intent that occur across domains and languages. For example, a multilingual corpus can be represented by two languages (e.g., English and Spanish) for two domains: airline and hospitality.

Figure 4:
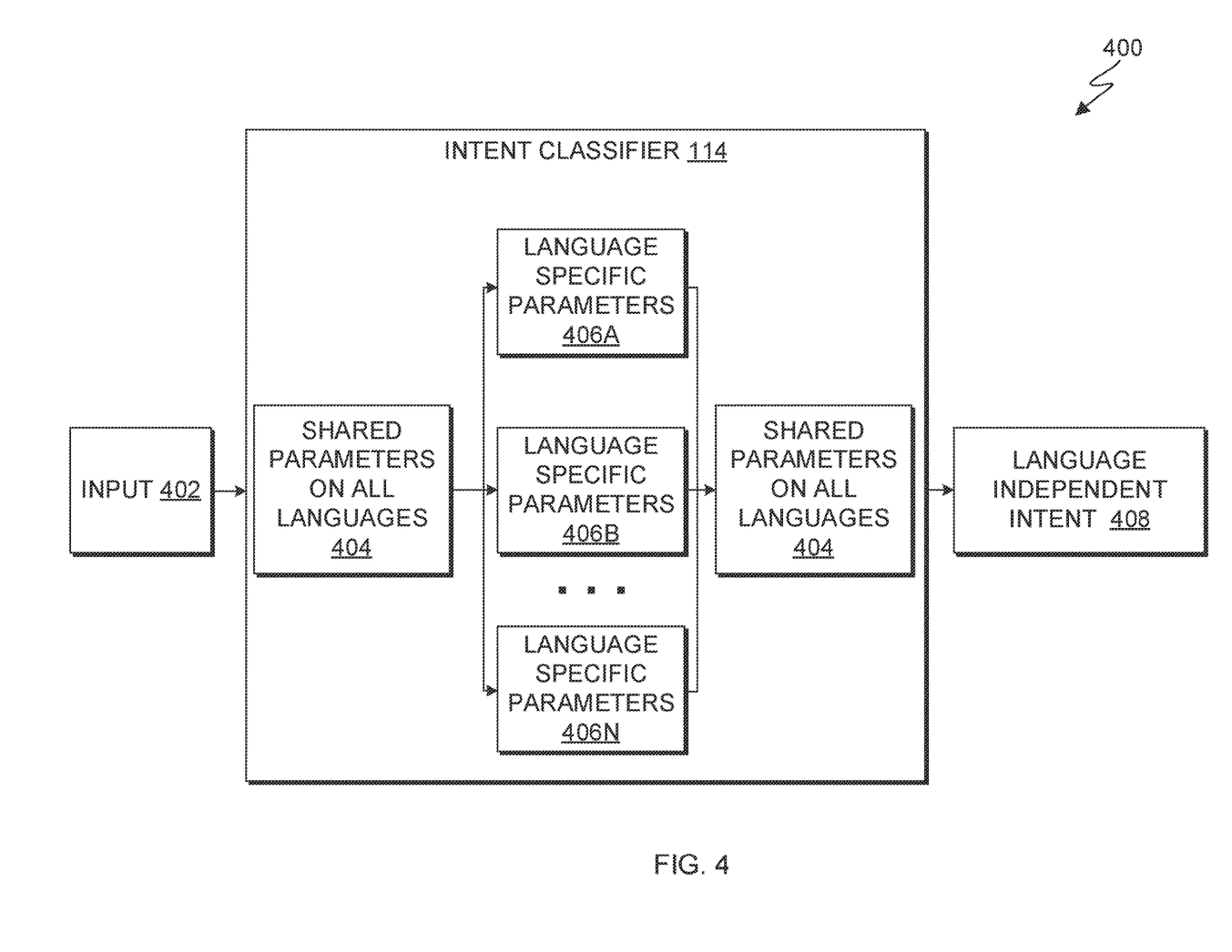
FIG. 4 depicts an example block diagram for a multilingual end to end speech to intent classifier for universal intent recognition, in accordance with an embodiment of the present invention.

In this embodiment, universal intent recognizer 110 can include an additional layer that is trained on top of the language specific layers which have learned language specific constructs as discussed in greater detail with respect to FIG. 4.

Consider the earlier embodiment of a multilingual airline reservation system. The data available to train this system is available in two parts. In the first data cut, only transcripts for the speech utterances in English and Spanish are available. The second data cut is a much smaller portion of corpus that has both transcripts and intent labels. With the first data cut, the network can be trained to identify key parts of each utterance that convey meaning. For example, the transcripts can be labelled with part-of-speech tags. Words marked as nouns are marked as values for entities likes "destination airport" while verb phrases like "fly to" are help identify intent. These constructs however appear in different variants across languages. As described in greater detail with respect to FIG. 4, layers in 404 learning language independent constructs, layers 406A-N can be considered as layers to learn POS representations for each language which are pooled together by layers in 404. The final layers in 408 map the various POS representations into intent labels.

As such, embodiments of the present invention can provide solutions for parameter sharing/learning from disparate data sets (multi-lingual, multi-domain, multiple data sets). Front end sharing (e.g., shared parameters on all languages 404) helps to model common speech sounds for example. There can however also be sharing that helps model common linguistic structures like nouns/verbs. If we have similar domains (travel for example) in multiple languages, we can share the pragmatic "domain logic". This kind of sharing is captured by shared layers after the language specific parameter layers (the second block currently also marked as 404 should be renumbered as it presents a different level of sharing).

Embodiments of the present invention also enable sharing data even when domains are not similar. By data sharing and pre-training certain parameters, embodiments of the present invention capture some universal characteristics of spoken language understanding (SLU) and alleviate data insufficiency in any one particular domain/language combination.

The multiple embodiments discussed herein provide varying levels of organization in terms of how intent labels can be organized. It is possible that there are cases where intent labels are standardized/shared and also cases where labels are not standardized/shared. Both such cases should benefit from the solutions provided by certain embodiments of the present invention because it allows for shared parameters and language/domain specific parameters at multiple levels.

For example, universal intent recognizer 110 can receive content including one or more languages, access shared parameters trained on all languages, identify one or more languages and specific parameters associated with each identified language. Intent classifier 114 can then access the shared parameters again to identify language independent intents. The various layers of the neural network can be considered as transforms that are applied to the input signal to produce various representations at levels of abstractions. The shared layers discussed in FIG. 5 (e.g., shared parameters on all languages 504) are responsible for removing unwanted channel and speaker variabilities. Language representations in terms of basic sound units etc. produced by the shared layers are then transformed to model the language specifics of each languages by layers 506A-N. The language specifics include language specific graphemes or phonetic representations. For each language, these refined representations can be used to extract the actual intent, graphemic symbols to construct the entity values as modeled by layers 508A-B etc.

In yet other embodiments, intent classifier 114 can be adapted to specific domains within the same language or even to new languages without retraining from scratching using a multilingual model. In such cases, the final language specific parameters of an existing model is replaced with a new domain and respective language specific layer, keeping the shared layers intact. The new model is then trained on the novel data to completion.

Domains and languages that match (e.g., within a certain threshold percentage) with the domains and languages used to train the multilingual network are examples of settings which the trained model can processed without retraining. Using the multilingual travel reservation system described earlier, the multilingual travel reservation system can be deployed in English or Spanish after training to produce generic travel intents. The final language specific parameters are replaced by using new output layers that correspond to a new set of intent labels as described earlier (e.g., as to how various parts of the network can be kept intact or otherwise replaced).

In yet other embodiments, intent classifier 114 can be adapted to train neural networks with other related tasks in addition to a primary classification task. In this manner, the primary classification task can be improved. As discussed earlier in the example when a speech utterance is processed by the intent classifier, it needs to produced not only the intent labels but also in many cases needs to produce the values that correspond to various entities. To correctly recognize the values, the intent recognition system (e.g., universal intent recognizer 110) should also be able to accurately produce text transcriptions. If the primary classification task is intent recognition (for example "book a flight"), a related classification task could be entity recognition (where the start and destination airports are also recognized).

Figure 5:
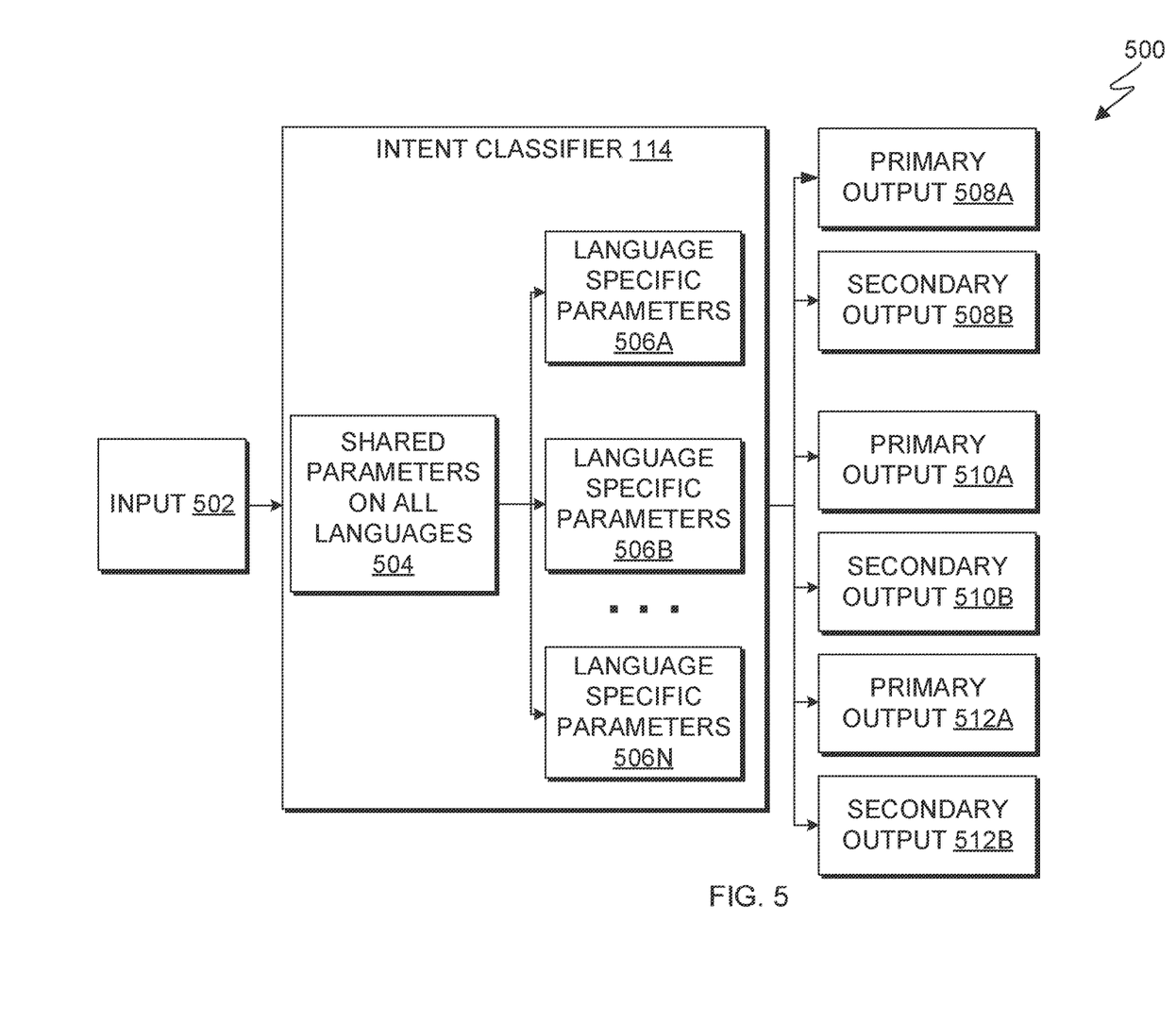
FIG. 5 depicts an example block diagram that depicts multi-task training of multilingual end to end speech to intent classifiers, in accordance with an embodiment of the present invention.

For example, embodiments of the present invention can improve the training of the proposed networks for intent recognition, multi-task training with other related tasks (e.g., phonetic/character recognition as discussed in greater detail with respect to FIG. 5. Some embodiments of the present invention can train these networks with self-supervision after the training data has been modified appropriately (e.g., addition of noise, speed/tone modifications).

Database 112 stores received information and can be representative of one or more databases that give permissioned access to universal intent recognizer 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 depicts an example block diagram 200 for training an end to end intent classifier, in accordance with an embodiment of the present invention.

In this example, input 202 is fed to intent classifier 114. Input 202 can include any combination of audio, text, and video. For example, input 202 can include multilingual speech identified in an audio file. In other embodiments, input 202 can be a live stream of audio. In other embodiments, input 202 can be a single language. Intent classifier 114 can then access shared parameters 204. Shared parameters 204 can be a set of pre-trained data.

Intent classifier 114 can then identify language specific parameters 206A, 206B through 206N and respectively output intent language 208A, 208B, and 208N. In general, intent language 208A, 208B, and 208N are one or more respective languages and intent associated with received input 202.

Figure 3:
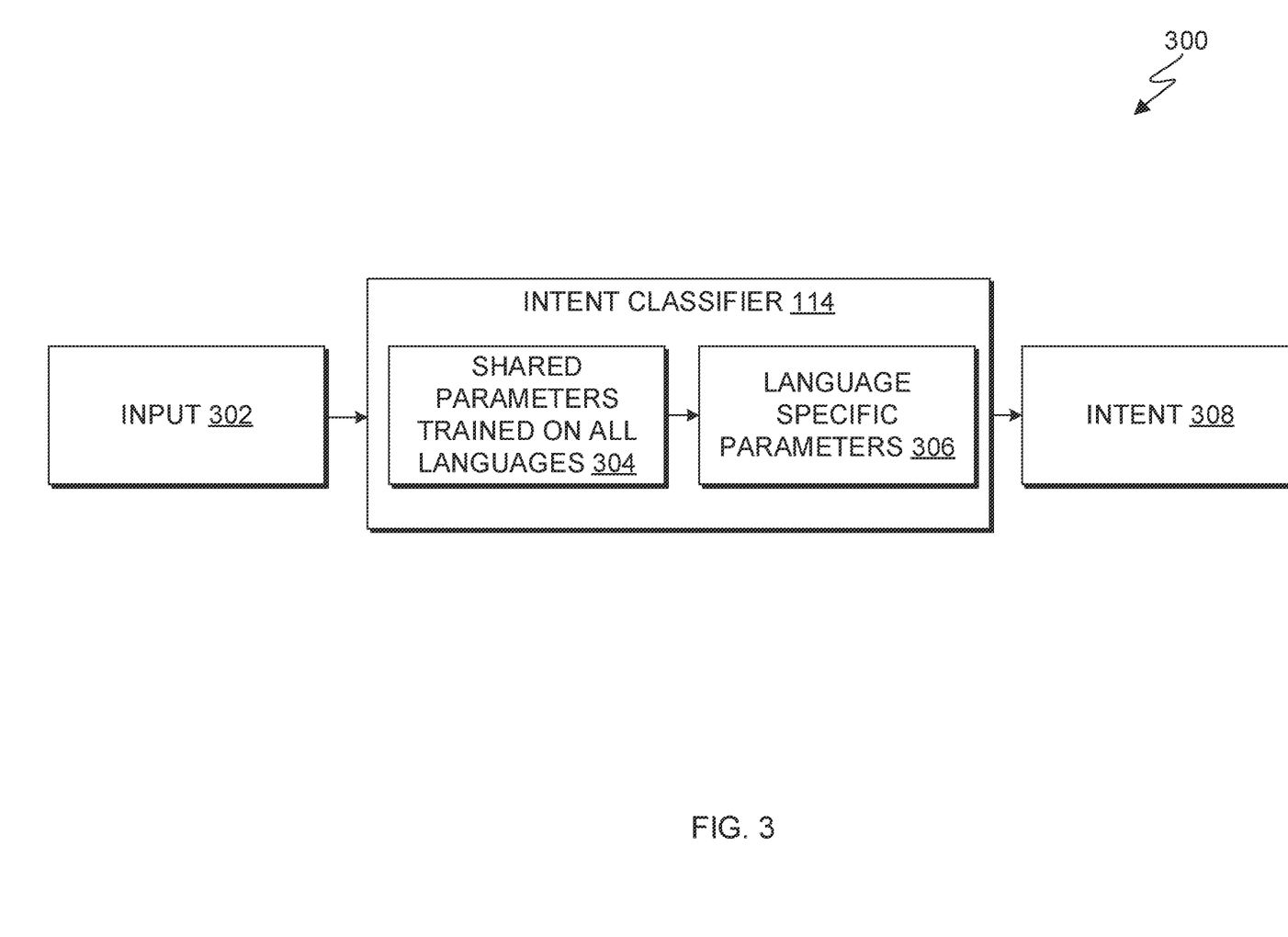
FIG. 3 depicts an example block diagram for an end to end speech to intent classifier adapted to a specific language, in accordance with an embodiment of the present invention.

FIG. 3 depicts an example block diagram 300 for an end to end speech to intent classifier adapted to a specific language, in accordance with an embodiment of the present invention.

This example depicts a model that has being initialized from a multilingual model and is being adapted to a particular task in a particular language. Component 304 (also referred to as shared parameters trained on all languages 304) is hence initialized from component 204.

In this example, input 302 is fed to intent classifier 114. Similar to input 202 of FIG. 2, input 302 can include any combination of audio, text, and video. In this embodiment, input 302 can be speech that is unknown or otherwise not been previously procced by intent classifier 114. In other words, input 302 can be non-training data fed through an intent classifier having been pre-trained. In other embodiments, input 302 can be a live stream of audio. Intent classifier 114 can then access shared parameters trained on all languages 304.

Intent classifier 114 can then identify language specific parameters 306, specific to received input 302 and accordingly identify intent 308, which is intent of received input 302.

FIG. 4 depicts an example block diagram 400 for a multilingual end to end speech to intent classifier for universal intent recognition, in accordance with an embodiment of the present invention.

In this example, input 402 is fed to or otherwise accessed by intent classifier 114. Input 402 can include any combination of audio, text, and video. In this example, input 402 is multilingual speech. In other embodiments, input 202 can be a live stream of audio of multilingual speech. Intent classifier 114 can then access shared parameters trained on all languages 404.

From there, intent classifier 114 can then identify language specific parameters 406A, 406B through 406N. Unlike the intent recognizer (containing intent classifier 114) discussed in FIG. 2, intent classifier 114 then accesses shared parameters on all languages 404 for a second time. Using shared parameters on all languages 404, intent classifier 114 can identify language independent intent 408. As described earlier, part-of-speech tags can be considered as language independent intent. In FIG. 4, layers in 404 learning language independent constructs, layers 406A-N can be considered as layers to learn POS representations for each language which are pooled together by layers in 404. The final layers in 408 map the various POS representations into intent labels.

In other embodiments, intent recognizers having intent classifier 114 can be adapted to specific domains within the same language or even to new languages without retraining from scratching using a multilingual model. In such cases, the final language specific parameters of an existing model is replaced with a new domain and respective language specific layer, keeping the shared layers intact. The new model is then trained on the novel data to completion.

FIG. 5 depicts an example block diagram 500 that depicts multi-task training of multilingual end to end speech to intent classifiers, in accordance with an embodiment of the present invention.

In this example, a universal intent recognizer having intent classifier 114 can be further improved (i.e., better trained) by assigning subtasks in addition to primary tasks. Primary tasks, as used herein, refer to the primary task of identifying intent from given or accessed speech data. Subtasks can be other related tasks (e.g., phonetic/character recognition). In yet other embodiments, a universal intent recognizer can train these networks with self-supervision after the training data has been modified appropriately (e.g., addition of noise, speed/tone modifications, etc.).

In this example, input 502 is fed to or otherwise accessed by intent classifier 114. Similar to input 202 of FIG. 2, input 502 can include any combination of audio, text, and video. In this example, input 502 is multilingual speech. In other embodiments, input 202 can be a live stream of audio of multilingual speech. Intent classifier 114 can then access shared parameters trained on all languages 504.

From there, intent classifier 114 can then identify language specific parameters 506A, 506B through 506N and accordingly identify primary outputs 508A, 510A, and 512A and corresponding secondary outputs 508B, 510B, and 512B, respectively. As described earlier, a primary task can be intent recognition. A secondary task could be recognizing graphemes/phonemes/words in the input as well often referred to as automatic speech recognition. The recognized sequences of graphemes/phonemes/words will be used to construct entity values.

Figure 6:
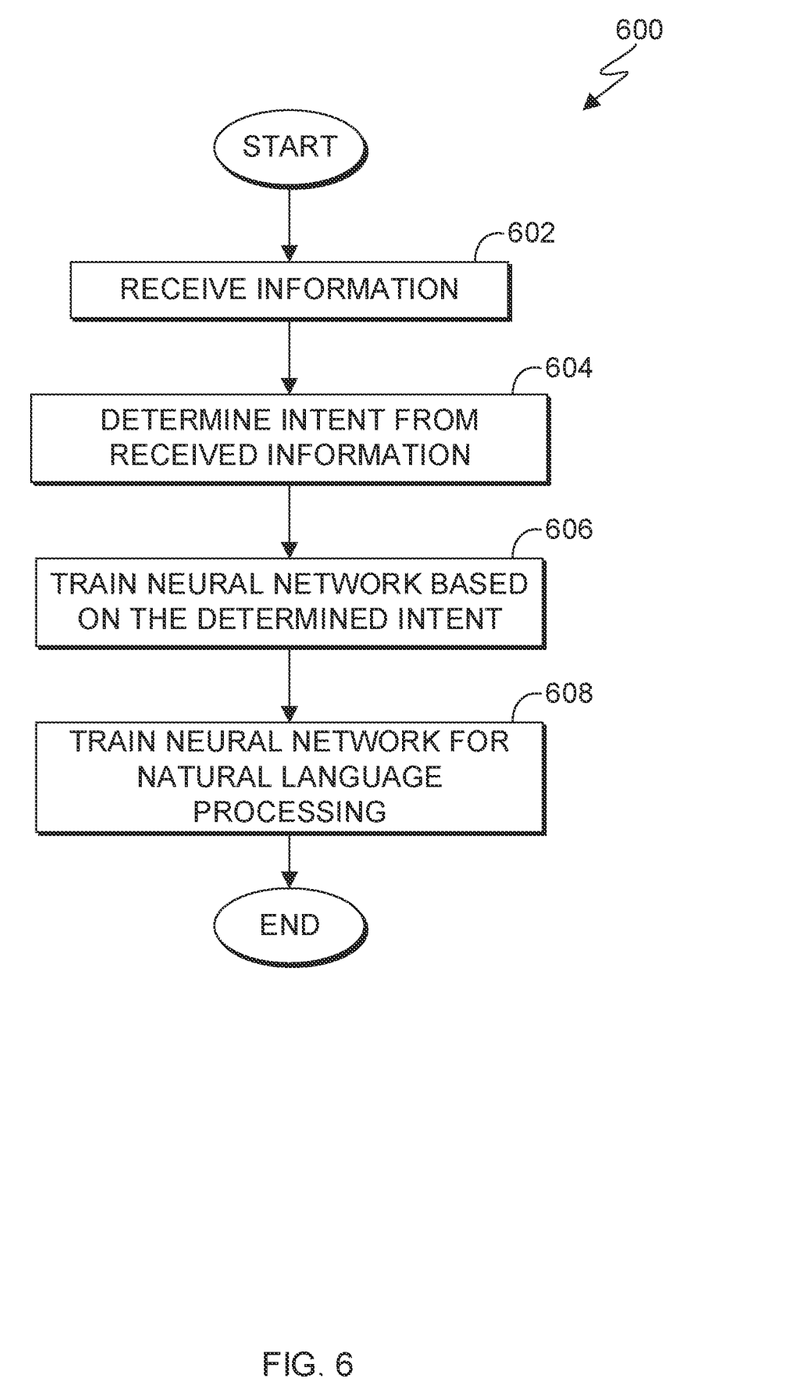
FIG. 6 depicts operational steps for training an end to end speech, multilingual intent classifier, in accordance with an embodiment of the present invention.

FIG. 6 is a flowchart 600 that depicts operational steps for training an end to end speech, multilingual intent classifier, in accordance with an embodiment of the present invention.

In step 602, universal intent recognizer 110 receives information. In this embodiment, universal intent recognizer 110 receives a request from client computing device 102. In other embodiments, universal intent recognizer 110 can receive information from one or more other components of computing environment 100.

Information received by universal intent recognizer 110 refers to speech or text information. Information received or otherwise accessed by universal intent recognizer 110 can include any combination of audio, text, and video. For example, information can include one or more languages. Information can also include a limited amount of speech to text training data in a single language. For example, the limited amount of speech to text training data in a single language can include interpreting intent and associated entities from voice in the single language. In certain embodiments, information can be a live stream of audio of multilingual speech. For example, universal intent recognizer 110 can receive information from one or more connected IoT devices.

In step 604, universal intent recognizer 110 determines intent from received information. In scenarios where universal intent recognizer 110 is first being trained, the received information can be used to pretrain universal intent recognizer 110. In this embodiment, universal intent recognizer 110 can determine intent from received information using a combination of one or more machine learning and artificial intelligence algorithms. In some embodiments, universal intent recognizer 110 can use existing neural network-based architectures. Universal intent recognizer 110 can then store the determined intent in database 112 as part of pre-trained data.

In certain embodiments, where universal intent recognizer 110 has already been pretrained, universal intent recognizer 110 can accessing the pretrained data that includes one or more intents and associated entities from limited amount of speech to text training data in a single language.

In step 606, universal intent recognizer 110 trains a neural network based on the determined intent. For example, universal intent recognizer 110 trains a neural network using the pretrained data. In this embodiment, the pretrained data can include shared parameters on all languages. The shared parameters are the layers of the network jointly trained on all languages.

Universal intent recognizer 110 can then locate other speech to text training data in one or more other languages using the pretrained data (e.g., accessed one or more intents and associated entities) to locate speech to text training data in one or more other languages different than the single language. Universal intent recognizer 110 can then determine language specific parameters based on the accessed shared parameters on all languages and subsequently storing the identified language specific parameters in a database (e.g., database 112).

In step 608, universal intent recognizer 110 trains a neural network for natural language processing. In this embodiment, universal intent recognizer 110 trains a neural network for natural language processing by accessing the updated database (e.g., database 112 updated in the previous step). Accordingly, universal intent recognizer 110, leveraging a trained intent classifier 114 can then identify intent from received input. More specifically, universal intent recognizer 110 can receive multilingual input and identify intent regardless of the received language utilizing smaller training data sample sizes.

Accordingly, universal intent recognizer 110 can be trained by preparing the multilingual/multi-domain/multi-corpus data with transcripts and intents. Universal intent recognizer 110 can then be trained with shared layers and language specific layers. In certain embodiments, universal intent recognizer 110 can prepare or otherwise have prepared domain/language/corpus specific data. Finally, universal intent recognizer 110 can adapt the universal intent recognizer using the data from the shared layers and language specific layers and can initialize as many layers as possible from the pretrained network.

Figure 7:
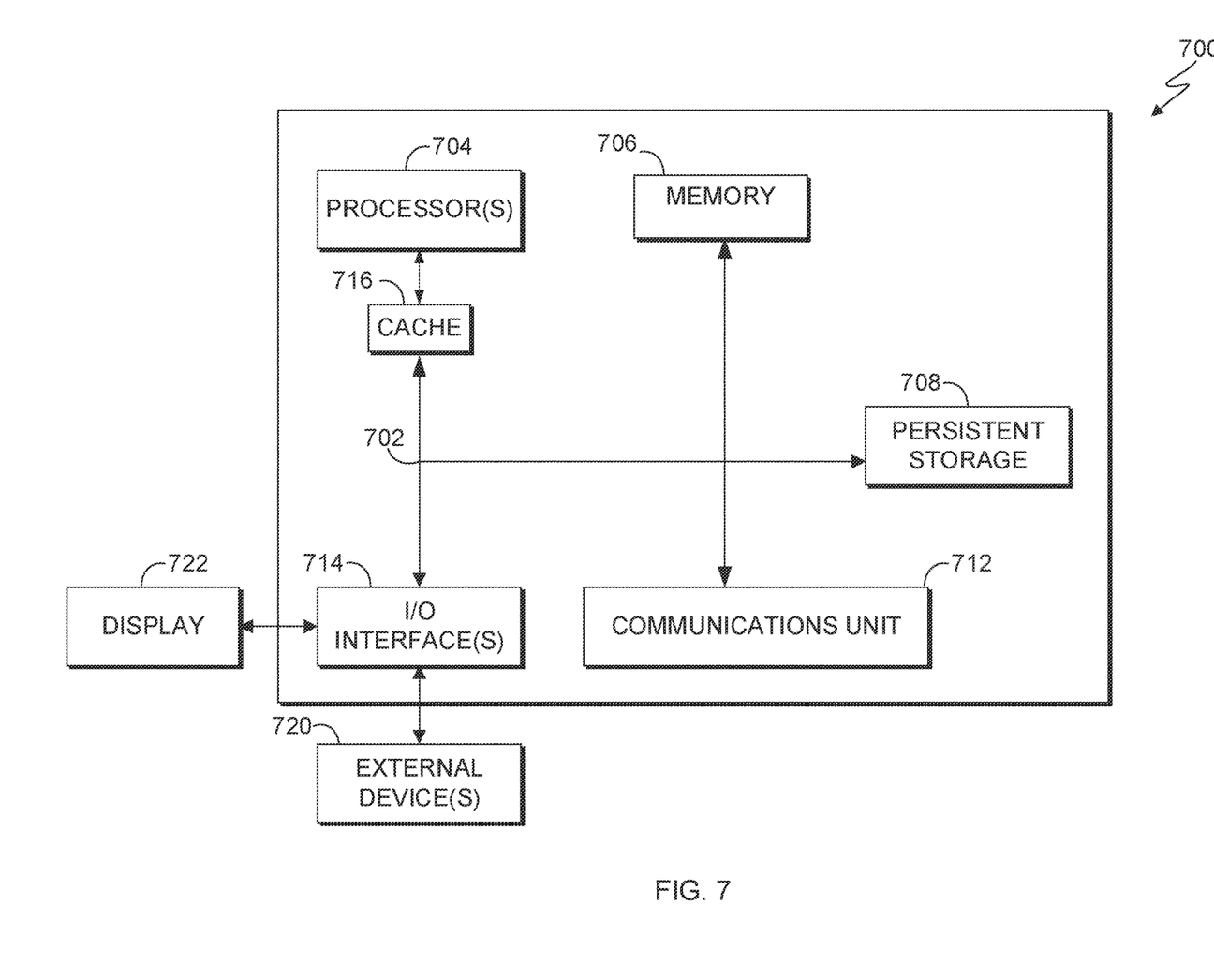
FIG. 7 is a block diagram of an example system, in accordance with an embodiment of the present invention.

FIG. 7 depicts a block diagram of components of computing systems within computing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 700 includes communications fabric 702, which provides communications between cache 716, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Universal intent recognizer 110 (not shown) may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. Universal intent recognizer 110 may be downloaded to persistent storage 708 through communications unit 712.

I/O interface(s) 714 allows for input and output of data with other devices that may be connected to client computing device and/or server computer. For example, I/O interface 714 may provide a connection to external devices 720 such as a keyboard, keypad, a touch screen, and/or some other suitable input device. External devices 720 can also include portable computer readable storage media such as, for example, thumb drives, portable optical or magnetic disks, and memory cards. Software and data used to practice embodiments of the present invention, e.g., universal intent recognizer 110, can be stored on such portable computer readable storage media and can be loaded onto persistent storage 708 via I/O interface(s) 714. I/O interface(s) 714 also connect to a display 722.

Display 722 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
accessing one or more intents and associated entities from limited amount of speech to text training data in a single language;
identifying candidate speech to text training data from one or more other languages, each language differing from the single language based on the accessed intents and associated entities;
pooling shared parameters from the identified candidate speech to text training data with the limited amount of speech to text training data in the single language;
training a neural network using the pooled shared parameters from the identified candidate speech to text training data and the limited amount of speech to text training data in the single language;
in response to receiving media containing speech associated with an unidentified language, identifying, in real time, at least one known language and domain that represents a topic discussed in the received media;
identifying language independent intent from the identified language using the pooled shared parameters and adding a respective label to the identified language and language independent intent; and
adapting the trained neural network to specific domains within the same language by replacing language specific parameters of the trained neural network with a new domain and respective language specific layer while maintaining shared layers.

2. The computer-implemented method of claim 1, further comprising:
training the neural network for natural language processing based on the limited amount of speech to text training data in the single language and the accessed speech to text training data in the one or more other languages.

3. The computer-implemented method of claim 1, wherein the limited amount of speech to text training data comprises a single language and interpreted intent and associated entities from voice in the single language.

4. The computer-implemented method of claim 1, wherein the limited amount of speech to text training data comprises a single language drawn from different datasets comprises a dataset collected to model dialog states and a dataset of voice commands.

5. The computer-implemented method of claim 1, further comprising:
enabling language switching by accessing a common domain and pooling different language datasets having shared commonalities in intents and entities.

6. The computer-implemented method of claim 1, wherein speech to text training data represents a set of layers of a neural network comprising a set of nodes with each layer connected to other layers in the set of layers via respective weighted connections.

7. The computer-implemented method of claim 1, further comprising:
learning language independent constructs for each known language by accessing the pooled shared parameters.

8. A computer program product comprising:
one or more computer readable storage media and program instructions stored on the one or more computer readable storage media, the program instructions comprising:
program instructions to access one or more intents and associated entities from limited amount of speech to text training data in a single language;
program instructions to identify candidate speech to text training data from one or more other languages, each language differing from the single language based on the accessed intents and associated entities;
program instructions to pool shared parameters from the identified candidate speech to text training data with the limited amount of speech to text training data in the single language;
program instructions to train a neural network using the pooled shared parameters from the identified candidate speech to text training data and the limited amount of speech to text training data in the single language;
program instructions to, in response to receiving media containing speech associated with an unidentified language, identify, in real time, at least one known language and domain that represents a topic discussed in the received media;
program instructions to identify language independent intent from the identified language using the pooled shared parameters and adding a respective label to the identified language and language independent intent; and
program instructions to adapt the trained neural network to specific domains within the same language by replacing language specific parameters of the trained neural network with a new domain and respective language specific layer while maintaining shared layers.

9. The computer program product of claim 8, wherein the program instructions stored on the one or more computer readable storage media further comprise:
program instructions to train the neural network for natural language processing based on the limited amount of speech to text training data in the single language and the accessed speech to text training data in the one or more other languages.

10. The computer program product of claim 8, wherein the limited amount of speech to text training data comprises a single language and interpreted intent and associated entities from voice in the single language.

11. The computer program product of claim 8, wherein the limited amount of speech to text training data comprises a single language drawn from different datasets comprises a dataset collected to model dialog states and a dataset of voice commands.

12. The computer program product of claim 8, wherein the program instructions stored on the one or more computer readable storage media further comprise:
program instructions to enable language switching by accessing a common domain and pooling different language datasets having shared commonalities in intents and entities.

13. The computer program product of claim 8, wherein speech to text training data represents a set of layers of a neural network comprising a set of nodes with each layer connected to other layers in the set of layers via respective weighted connections.

14. A computer system comprising:
one or more computer processors;
one or more computer readable storage media; and
program instructions stored on the one or more computer readable storage media for execution by at least one of the one or more computer processors, the program instructions comprising:
program instructions to access one or more intents and associated entities from limited amount of speech to text training data in a single language;
program instructions to identify candidate speech to text training data from one or more other languages, each language differing from the single language based on the accessed intents and associated entities;
program instructions to pool shared parameters from the identified candidate speech to text training data with the limited amount of speech to text training data in the single language;
program instructions to train a neural network using the pooled shared parameters from the identified candidate speech to text training data and the limited amount of speech to text training data in the single language;
program instructions to, in response to receiving media containing speech associated with an unidentified language, identify, in real time, at least one known language and domain that represents a topic discussed in the received media;
program instructions to identify language independent intent from the identified language using the pooled shared parameters and adding a respective label to the identified language and language independent intent; and
program instructions to adapt the trained neural network to specific domains within the same language by replacing language specific parameters of the trained neural network with a new domain and respective language specific layer while maintaining shared layers.

15. The computer system of claim 14, wherein the program instructions stored on the one or more computer readable storage media further comprise:
program instructions to train the neural network for natural language processing based on the limited amount of speech to text training data in the single language and the accessed speech to text training data in the one or more other languages.

16. The computer system of claim 14, wherein the limited amount of speech to text training data comprises a single language and interpreted intent and associated entities from voice in the single language.

17. The computer system of claim 14, wherein the limited amount of speech to text training data comprises a single language drawn from different datasets comprises a dataset collected to model dialog states and a dataset of voice commands.

18. The computer system of claim 14, wherein the program instructions stored on the one or more computer readable storage media further comprise:
 program instructions to enable language switching by accessing a common domain and pooling different language datasets having shared commonalities in intents and entities.

* * * * *